(12) United States Patent
Seacat DeLuca et al.

(10) Patent No.: US 9,626,371 B2
(45) Date of Patent: Apr. 18, 2017

(54) ATTRIBUTE SELECTABLE FILE OPERATION

(75) Inventors: Lisa Seacat DeLuca, San Francisco, CA (US); Travis M. Grigsby, Austin, TX (US); Christopher J. Hardee, Raleigh, NC (US); Andrew J. Ivory, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 12/980,980

(22) Filed: Dec. 29, 2010

(65) Prior Publication Data
US 2012/0173489 A1 Jul. 5, 2012

(51) Int. Cl.
G06F 7/00 (2006.01)
G06F 17/00 (2006.01)
G06F 17/30 (2006.01)

(52) U.S. Cl.
CPC .............................. G06F 17/30115 (2013.01)

(58) Field of Classification Search
CPC ............... G06F 17/00; G06F 17/30115; G06F 17/30203; G06F 17/30156; G06F 17/30215; G06F 17/30356; G06F 17/30194; G06F 17/30174; G06F 17/30581; G06F 17/3023; G06F 21/552; G06F 11/1435
See application file for complete search history.

(56) References Cited

U.S. PATENT DOCUMENTS

| | | | |
|---|---|---|---|
| 6,345,319 B2 | 2/2002 | Lin et al. | |
| 6,549,916 B1 * | 4/2003 | Sedlar | |
| 2005/0246376 A1 * | 11/2005 | Lu et al. | 707/104.1 |
| 2006/0242073 A1 | 10/2006 | Padawer et al. | |
| 2007/0226238 A1 | 9/2007 | Kiilerich et al. | |
| 2008/0010599 A1 | 1/2008 | Janakiraman et al. | |
| 2008/0091790 A1 | 4/2008 | Beck | |
| 2009/0044146 A1 | 2/2009 | Patel et al. | |
| 2009/0300483 A1 | 12/2009 | Viet | |
| 2010/0023557 A1 | 1/2010 | Sureshkumar | |

* cited by examiner

*Primary Examiner* — Azam Cheema
(74) *Attorney, Agent, or Firm* — Steven M. Greenberg, Esq.; CRGO Law

(57) ABSTRACT

Embodiments of the present invention provide a method, system and computer program product for attribute based file operation implementation selection. In an embodiment of the invention, a method for providing selectable implementations of a file operation is provided. The method includes receiving a directive to perform a file operation on a particular file stored in fixed storage of a computer and identifying an attribute of the particular file. An implementation of the file operation can be selected amongst different implementations of the file operation that maps to the identified attribute. Thereafter, the selected implementation of the file operation can be invoked to perform the file operation upon the particular file.

23 Claims, 1 Drawing Sheet

ATTRIBUTE SELECTABLE FILE OPERATION

BACKGROUND OF THE INVENTION

Field of the Invention

The present invention relates to file operations in a file management data processing system and more particularly to file copy and move operations.

Description of the Related Art

The operating system requisite to the operation of any computer system provides two basic functions: loading and managing the operation of a computer program and storing and retrieving data in data files stored in fixed storage or memory of the computer system. For many decades, numerous file operations such as create, delete, open, move and copy were included as programmatic modules of the operating system distribution. In this regard, file copying and moving remain the most common file operations performed by computer users.

There are many third party computer programs directed to file operations. One commercially available tool provides file operational capabilities above and beyond those included as part of the traditional disk operating system—namely the "copy" and "xcopy" commands. Some of the notable capabilities include the ability to tolerate network interruptions and resume copying, the ability to correctly copy file data, attributes and preserve original timestamps, the ability to automatically retry a programmable number of times if a file cannot be opened, the ability to skip files that already appear in the destination folder with identical size and timestamp, and the ability to copy large numbers of files that would otherwise crash the built-in XCOPY utility.

However, most third party add-on tools treat files in an operating system in the same way during file copying and moving regardless of the file type or other information about the files. More particularly, while on the surface, files appear the same to a computer in terms of structure, some files, depending upon the type of file, or the content of the file, can be handled faster or in better ways by utilizing different computational behaviors during basic file operations. For example, the modern Web browser performs the create file operation on a downloaded file differently in that files can be downloaded to different folders according to file extensions or keywords. Just the same, launching execution of a file can invoke a supporting file viewer depending upon a file extension of the file.

BRIEF SUMMARY OF THE INVENTION

Embodiments of the present invention address deficiencies of the art in respect to file operations in a computing system and provide a novel and non-obvious method, system and computer program product for attribute based file operation implementation selection. In an embodiment of the invention, a method for providing selectable implementations of a file operation is provided. The method includes receiving a directive to perform a file operation on a particular file stored in fixed storage of a computer and identifying an attribute of the particular file. An implementation of the file operation can be selected amongst different implementations of the file operation that maps to the identified attribute. Thereafter, the selected implementation of the file operation can be invoked to perform the file operation upon the particular file.

In another embodiment of the invention, a file management data processing system can be provided. The system can include a computer with at least one processor and memory and fixed storage and an operating system executing in the computer. The system also can include different implementations of a file operation coupled to the operating system. Finally the system can include a file operation selector module coupled to the operating system. The module can include program code enabled to receive from the operating system a directive to perform a file operation on a particular file stored in fixed storage of the computer, to identify an attribute of the particular file, to select an implementation of the file operation amongst a plurality of implementations of the file operation that maps to the identified attribute, and invoke the selected implementation of the file operation to perform the file operation upon the particular file.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for selecting a file operation implementation based upon the attributes of a file subject to a directed file operation . In accordance with an embodiment of the invention, a file operation such as a copy or move file operation can be directed for performance upon a particular file. At least one attribute of the particular file can be identified, such as a file type, file size, file location, file creator, file permissions and the like. Thereafter, one or more of the attributes can be mapped to a particular implementations of the file operation from amongst a multiplicity of different implementations of the file operation. If no mapping is provided, a default implementation of the file operation can be called to perform the file operation upon the particular file. Otherwise the mapped implementation can be called upon to perform the file operation upon the particular file. In this way, the file operation can be handled by the implementation of the file operation best suited for the file attribute or attributes so as to improve operation efficiency.

Figure 1:
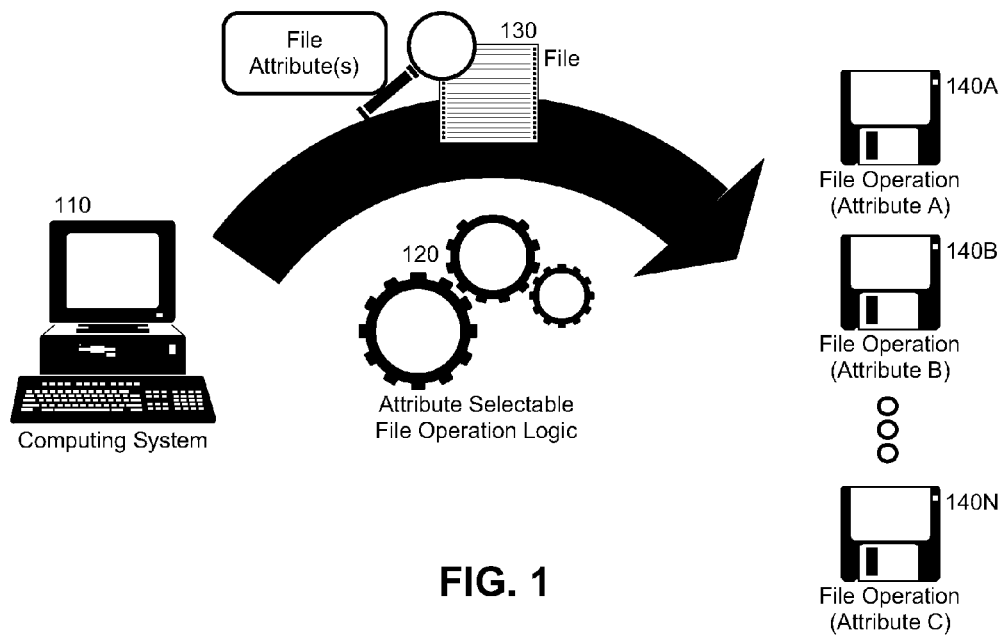
FIG. 1 is a pictorial illustration of a process for selecting a file operation implementation based upon the attributes of a file subject to a directed file operation.

In more particular illustration, FIG. 1 is pictorial illustration of a process for selecting a file operation implementation based upon the attributes of a file subject to a directed file operation. As shown in FIG. 1, a file operation such as a file move, file create, file delete, file open or file copy operation can be directed for performance upon a file 130 in a computing system 110. Attribute selectable file operation logic 120 can inspect one or more attributes of the file 130, for instance a file type, file size, file location, file creator, file permissions and the like. Subsequently, attribute selectable file operation logic 120 can map one or more of the attributes to a particular implementation of the file operation from amongst multiple different file operation implementations 140A, 140B, 140N. Finally, the mapped one of the multiple different file operation implementations 140A, 140B, 140N can be invoked to perform the directed file operation upon the file 130.

For example, where the file 130 is a database file subject to a directive for file deletion, an implementation of a file delete operation mapping to a database can be selected that may require a password to complete the deletion, whereas where the file 130 is a temporary file subject to the same directive for file deletion, a less cautious implementation of the file delete operation not requiring a password or confirmation can be selected given the nature of a temporary file. Likewise, where the size of the file 130 is very large and subject to a directive for a file copy, an implementation of a file copy operation mapping to large files can be selected that may prompt the end user to defer copying until off hours given the size of the file, whereas where the file 130 is small in size and subject to the same directive for file copying, a less cautious implementation of the file copy operation not prompting the user to confirm copying can be selected. As yet a further example, where the file 130 is an archive of files, an implementation of a file move operation mapping to an archive can be selected that may first determine that all files listed in a manifest for the archive are present before permitting the move operation to proceed, whereas where the file 130 is a word processing document subject to the same directive for file move, a less cautious implementation of the file move not requiring a manifest audit can be selected given the nature of a word processing file.

Figure 2:
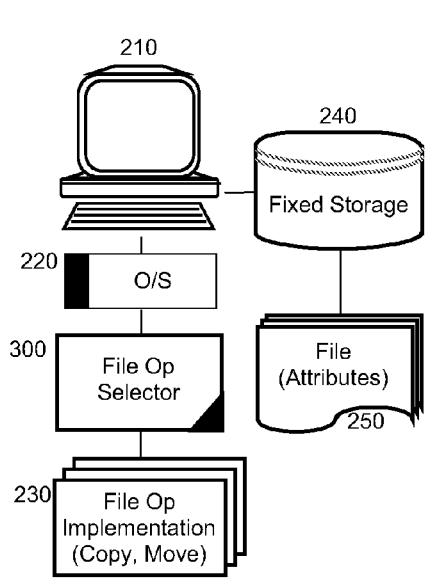
FIG. 2 is a schematic illustration of a file management data processing system configured for selecting a file operation implementation based upon the attributes of a file subject to a directed file operation.

The process described in connection with FIG. 1 can be implemented in a file management data processing system. In yet further illustration, FIG. 2 schematically depicts a file management data processing system configured for selecting a file operation implementation based upon the attributes of a file subject to a directed file operation. The system can include a host computer 210 with at least one processor and memory coupled to fixed storage 240 and supporting the execution of an operating system 220. The operating system 220 in turn can manage the execution of one or more applications (not shown) and can provide different file operations, such as a create, open, read, delete, move and copy.

Of note, a file operation selector module 300 can be coupled to the operating system 220. The module 300 can include program code that when executed by one or more of the processors of the host computer 210, can respond to a directive in the operating system 220 to perform a file operation upon a selected file 250 in fixed storage 240, by determining one or more file attributes of the selected file 250 and mapping the selected attribute or attributes to a particular file operation implementation 230 of the file operation, for example a file move or a file copy operation.

Optionally, the selection of a particular file operation implementation 230 can be based upon a target location of a file copy or file move operation.

Figure 3:
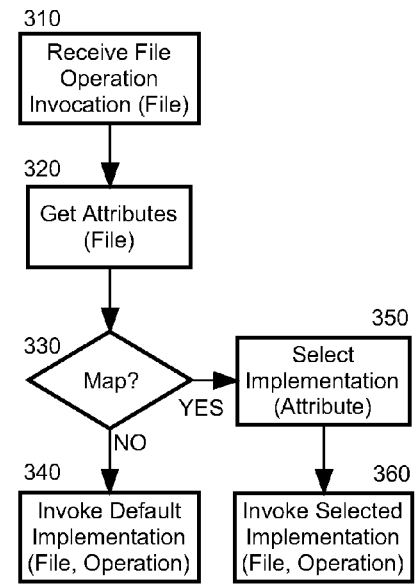
FIG. 3 is a flow chart illustrating a process for selecting a file operation implementation based upon the attributes of a file subject to a directed file operation.

In even yet further illustration of the operation of the file operation selector module 300, FIG. 3 is a flow chart illustrating a process for selecting a file operation implementation based upon the attributes of a file subject to a directed file operation. Beginning in block 310, a directive to perform a file operation on a particular file stored in fixed storage can be received. In block 320, the attributes of the particular file can be determined, for instance a file type, file size, file location, file creator, file permissions and the like. In decision block 330, one or more of the file attributes can be mapped to an implementation of the file operation. If a specific implementation of the file operation cannot be mapped to the file attributes, in block 340 a default implementation of the file operation can be invoked for the particular file. Otherwise, in block 350 the mapped specific implementation of the file operation can be selected and in block 360, the selected specific implementation of the file operation can be invoked for the particular file.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for selecting a file operation implementation based upon the attributes of a file subject to a directed file operation, the method comprising:
   receiving from an operating system a directive to perform a file operation on a particular file stored in fixed storage of a computer;
   identifying an attribute of the particular file;
   determining if a mapping exists between the identified attribute and a specific implementation of the file operation; and,
   responsive to a determination that the mapping exists, by selecting an implementation of the file operation amongst a set of implementations of the file operation that maps to the identified attribute within the mapping, but otherwise selecting a default implementation of the file operation; and,
   invoking the selected implementation of the file operation to perform the file operation upon the particular file.

2. The method of claim 1, wherein the file operation is an operation selected from the group consisting of a move file operation and a copy file operation.

3. The method of clam 1, wherein the attribute of the particular file is a file type.

4. The method of claim 3, wherein invoking the selected implementation of the file operation to perform the file operation upon the particular file, comprises:
   identifying a list of files in a manifest for the particular file, the particular file comprising an archive; and, perform the file operation upon the particular file only if all files in the list of files are present in the archive.

5. The method of clam 1, wherein the attribute of the particular file is a file size.

6. The method of clam 1, wherein the attribute of the particular file is a file creator.

7. The method of clam 1, wherein the attribute of the particular file is a file permission.

8. The method of clam 1, wherein the attribute of the particular file is a file creator.

9. A file management data processing system comprising:
a computer with at least one processor and memory and fixed storage;
an operating system executing in the computer;
a plurality of different implementations of a file operation coupled to the operating system; and,
a file operation selector module coupled to the operating system, the module comprising program code enabled to receive from the operating system a directive to perform a file operation on a particular file stored in fixed storage of the computer, to identify an attribute of the particular file, to determine if a mapping exists between the identified attribute and a specific implementation of the file operation, to respond to a determination that the mapping exists, by selecting an implementation of the file operation amongst a set of implementations of the file operation that maps to the identified attribute within the mapping, but otherwise selecting a default implementation of the file operation, and invoke the selected implementation of the file operation to perform the file operation upon the particular file.

10. The system of claim 9, wherein the file operation is an operation selected from the group consisting of a move file operation and a copy file operation.

11. The system of claim 9, wherein the attribute of the particular file is a file type.

12. The system of claim 9, wherein the attribute of the particular file is a file size.

13. The system of claim 9, wherein the attribute of the particular file is a file creator.

14. The system of claim 9, wherein the attribute of the particular file is a file permission.

15. The system of claim 9, wherein the attribute of the particular file is a file creator.

16. A computer program product for selecting a file operation implementation based upon the attributes of a file subject to a directed file operation, the computer program product comprising:

a non-transitory computer readable storage medium having computer readable program code embodied therewith, the computer readable program code comprising:

computer readable program code for receiving from an operating system a directive to perform a file operation on a particular file stored in fixed storage of a computer;

computer readable program code for identifying an attribute of the particular file;

computer readable program code for determining if a mapping exists between the identified attribute and a specific implementation of the file operation; and, computer readable program code for responding to a determination that the mapping exists, by selecting an implementation of the file operation amongst a set of implementations of the file operation that maps to the identified attribute within the mapping, but otherwise selecting a default implementation of the file operation; and, computer readable program code for invoking the selected implementation of the file operation to perform the file operation upon the particular file.

17. The computer program product of claim 16, wherein the file operation is an operation selected from the group consisting of a move file operation and a copy file operation.

18. The computer program product of claim 16, wherein the attribute of the particular file is a file type.

19. The computer program product of claim 18, wherein the computer readable program code for invoking the selected implementation of the file operation to perform the file operation upon the particular file, comprises:

computer readable program code for identifying a list of files in a manifest for the particular file, the particular file comprising an archive; and, computer readable program code for perform the file operation upon the particular file only if all files in the list of files are present in the archive.

20. The computer program product of claim 16, wherein the attribute of the particular file is a file size.

21. The computer program product of claim 16, wherein the attribute of the particular file is a file creator.

22. The computer program product of claim 16, wherein the attribute of the particular file is a file permission.

23. The computer program product of claim 16, wherein the attribute of the particular file is a file creator.

* * * * *